(12) United States Patent
Swales et al.

(10) Patent No.: US 6,402,945 B1
(45) Date of Patent: Jun. 11, 2002

(54) WATER TREATMENT SYSTEM AND METHOD

(75) Inventors: Graham Edward Swales, Orillia; James Edward Swales, Barrie; Thomas W. Bain, Mississauga; Hubert Roger Hart, Toronto, all of (CA)

(73) Assignee: Great Lakes Clean Water Limited, Mississauga (CA)

( * ) Notice: Subject to any disclaimer, the term of this patent is extended or adjusted under 35 U.S.C. 154(b) by 0 days.

(21) Appl. No.: 09/533,261

(22) Filed: Mar. 22, 2000

Related U.S. Application Data

(60) Provisional application No. 60/125,782, filed on Mar. 23, 1999.

(51) Int. Cl.[7] .................................................. C02F 1/78
(52) U.S. Cl. .................... 210/195.1; 210/199; 210/205; 210/257.1
(58) Field of Search ................................ 210/744, 760, 210/205, 192, 195.1, 765, 257.1, 919, 752, 199, 167; 261/18.1, DIG. 42, DIG. 75

(56) References Cited

U.S. PATENT DOCUMENTS

| | | | | |
|---|---|---|---|---|
| 5,075,016 A | * | 12/1991 | Barnes | 210/760 |
| 5,160,606 A | * | 11/1992 | De Simone et al. | 210/209 |
| 5,302,288 A | * | 4/1994 | Meidl et al. | 210/760 |
| 5,409,616 A | * | 4/1995 | Garbutt et al. | 210/760 |
| 5,427,693 A | * | 6/1995 | Mausgrover et al. | 210/760 |
| 5,498,330 A | * | 3/1996 | Delle Cave | 210/167 |
| 5,683,576 A | * | 11/1997 | Olsen | 210/760 |
| 6,013,189 A | * | 1/2000 | Burris | 210/760 |
| 6,039,884 A | * | 3/2000 | Burris et al. | 210/760 |
| 6,068,778 A | * | 5/2000 | Steiner et al. | 210/760 |
| 6,146,524 A | * | 11/2000 | Story | 210/205 |
| 6,153,111 A | * | 11/2000 | Conrad et al. | 210/760 |

* cited by examiner

Primary Examiner—Duane Smith
Assistant Examiner—Frank M. Lawrence
(74) Attorney, Agent, or Firm—Bereskin & Parr

(57) ABSTRACT

A method of handling grey water and optionally at least a portion of black water for disposal from vehicles such as boats, recreational vehicles or rural dwellings such as cottages, camps and the like, not having direct access to sewer systems, involves the treatment of such waste water with ozone. A batch system is used whereby a predetermined quantity of water to be treated is captured in a treatment tank. A circulating pump withdraws water from the tank and pushes the water along a treatment conduit, the conduit containing an ozone/water mixer and returns the water to the treatment tank. The treatment conduit has a discharge valve that is maintained in a closed position for a selected period of time. Ozone is fed to the ozone/water mixer from an ozone generator which is advantageously fitted with an air pump to pressurize the feed gas. After the selected treatment time, the batch is discharged to a drain through the discharge valve. Advantageously, the ozone generator can also be used to "polish" raw water from a lake or stream to enhance its usability on board a vessel or in a rural dwelling.

14 Claims, 3 Drawing Sheets

WATER TREATMENT SYSTEM AND METHOD

CROSS-REFERENCE TO RELATED APPLICATIONS

This application claims benefit from U.S. Provisional Application Ser. No. 60/125,782 filed Mar. 23, 1999 which is incorporated herein by reference in its entirety.

FIELD OF THE INVENTION

The invention relates to a method and apparatus for the treatment of water. The water treatment method and apparatus may be applied to fluids such as grey or black water to be treated prior to discharge or raw water to be treated prior to consumption.

BACKGROUND OF THE INVENTION

In the field of grey/black water disinfection, great efforts are continuously being made to reduce the quantity and concentration of pollutants found in grey/black water being discharged into rivers, lakes, surface and ground water supplies, etc. This is evidenced by more and stricter government regulations and requirements relating to grey/black water treatment processes and discharges. The quantities of human wastes requiring treatment are constantly and rapidly increasing. In the field of potable water purification, available surface and ground water sources are rapidly deteriorating due to pollution caused by contaminates generated by a growing population and their careless use of water and improper disposal of waste products.

Many methods exist for the treatment of grey/black water. Biological or chemical disinfection of the grey/black water to neutralize the harmful micro organisms within grey/black water are common methods employed to reduce bacteria loading found in grey/black water. Biological disinfection of grey/black water requires large tanks for micro organisms to consume the biological waste contained within the grey/black water. Chemical disinfection of grey/black water is not acceptable for water based communities and activities.

Many methods also exist for the purification of potable water which include the use of chemical disinfectants, microfiltration and ultra-violet radiation. The most commonly used disinfectant is chlorine and when water containing organic material and compounds is chlorinated, a range of carcinogenic trihalomethanes is generated and considerable contact time is required for effective disinfection. When microfiltration is used to remove biological contaminants, the filtering devices require constant and regular servicing. When ultra-violet radiation is used to make water potable, the effectiveness is limited by the clarity of the water being treated. These physical and chemical factors place severe limitations on these methods of disinfection in recreation facilities.

SUMMARY OF THE INVENTION

In accordance with the invention, there is a system for treating water for disposal. The system comprises a treatment tank, a treatment conduit, a water circulating pump, ozone generating means, ozone water mixing means, a discharge valve and control means. The control means are adapted to control cycling of the water circulation pump. The control means also control generation of ozone by the ozone generator. The control means further control the position of the discharge valve. The treatment tank includes water level sensing means to determine the presence of a fixed quantity of water in the treatment tank. The control means comprise timing means for operating the water circulation pump for a selectable time period.

In accordance with the invention, a method for treating water prior to disposal comprises the steps of collecting a predetermined quantity of water to be treated in a treatment tank and thereafter mixing with the predetermined quantity of water to be treated, ozone. The selected quantity of water to be treated is mixed with the ozone for a selected period of time. Thereafter the mixed water is discharged to waste.

In another aspect of the invention, the output of the ozone generator may also be directed to a water intake system. Lake water drawn into the water intake system is mixed with ozone from the ozone generator to treat the raw water to enhance the quality of the raw water for drinking purposes. The treated water may also be filtered to further enhance the potability of the water.

BRIEF DESCRIPTION OF THE FIGURES

The invention will now be discussed in association with the following drawings, which illustrate preferred embodiments of the invention.

The term "grey water" is used in this description and in the claims to describe water which is not human sewage but results from use by humans such as in washing and the like. The term "grey water" can encompass effluent from sinks, showers and the like. The term "black water" is used in this description and claims to refer to water in which human sewage is a significant component. Black water normally results from effluent from toilets and the like.

The term "potable water" is used in this description and claims to refer to water which is fit for human consumption.

The term "raw water" is used in this disclosure and claims to refer to ambient liquid such as may be found in surface water comprising lakes, rivers, streams and the like, and in addition, ground water such as may be contained in wells, whether dug or drilled, as well as run off water such as collected rain water and the like. The term "raw water" is intended to cover all liquids other than water which is primarily either grey water or black water.

The term "disinfection" as used in this disclosure and the claims, refers to treatment of water to reduce the harmful bacteria content of the water. In the case of use of the term "disinfection" with grey water or black water, the term is intended to encompass reducing the bacteria content of the water to a level acceptable for discharge to the intended environment, whether that be on land or into other surface water. In connection with the term potable water, the term "disinfection" is intended to encompass reducing the bacterial content of raw water to the state that the water, after treatment, is suitable for human drinking consumption.

Figure 1:
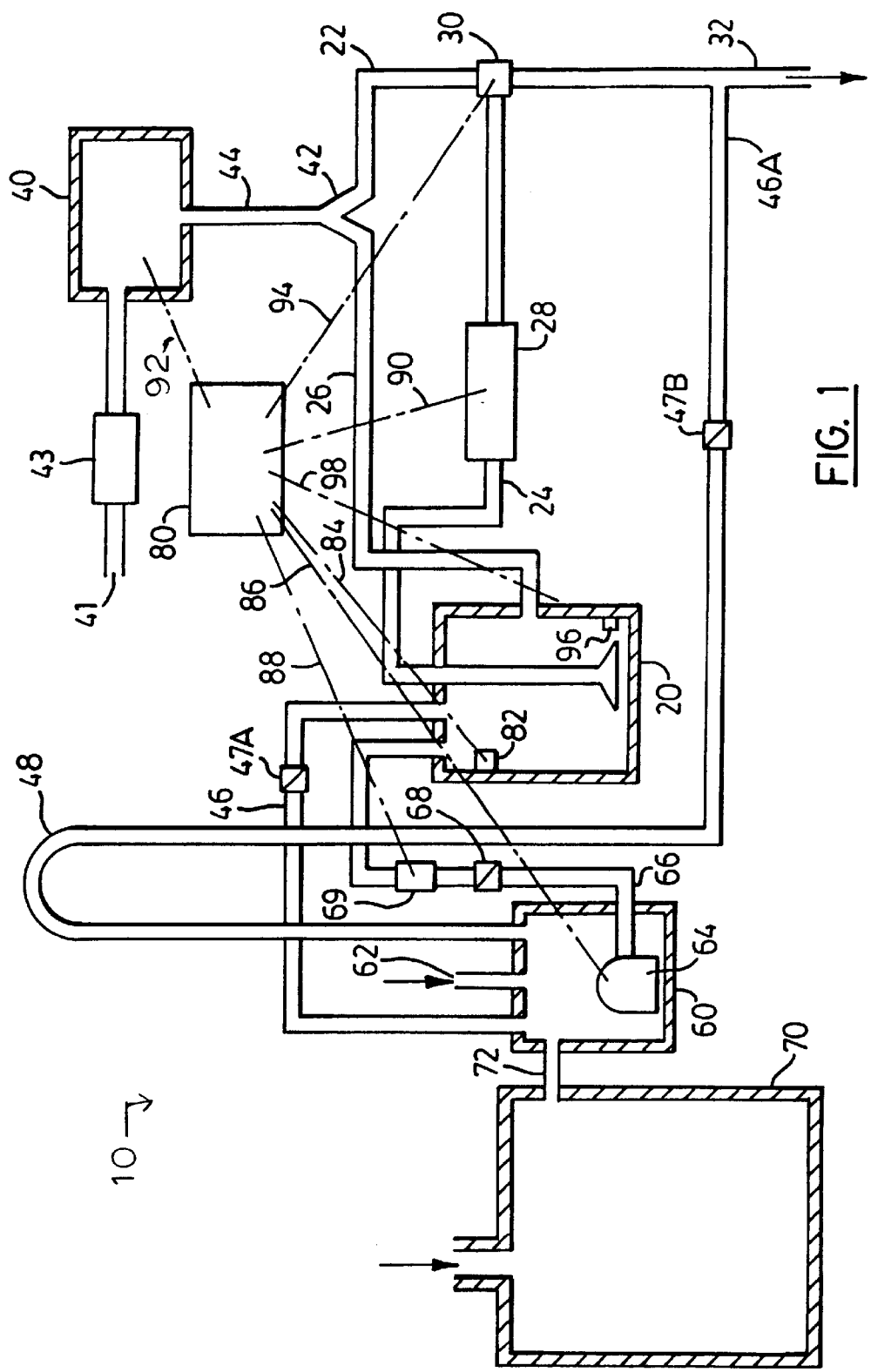
FIG. 1 illustrates a system embodying a first aspect of the invention.

The embodiment of the water treatment system illustrated in FIG. 1 is illustrated generally at 10. The principal components of the system include a treatment tank 20, a solenoid controlled discharge valve 30, a controller 80, and an ozone generator 40. Preferably, the system includes a grey water collection tank 60. Optionally, the system may also include a black water collection tank 70.

The water treatment system 10 includes a treatment conduit 22 comprising withdrawal conduit 24 and a return conduit 26, a circulating pump 28, and a treatment mixer 42. The system 10 further comprises a supply conduit 44 and a vent conduit 46. The system 10 also includes a discharge conduit 32, and an air inlet 41.

The valve 30 includes a solenoid for controlling the position of the valve 30.

The grey water collection tank 60 includes an inlet 62, a transfer pump 64 and a transfer conduit 66 which advantageously includes a check valve 68.

The embodiment illustrated in FIG. 1 is particularly adapted for use in vehicles having relatively reduced space for collection of grey water and advantageously black water. Such vehicles may include recreation vehicles, water vessels and the like. It should be understood, however, that while the invention is discussed in association with its application to a marine vessel, the system is equally applicable to use in land based mobile vehicles such as recreational vehicles and the like and also to fixed installations such as in buildings not having connection access to sewage treatment systems such as rural properties, cottages and the like.

Grey water is collected by suitable piping from all sinks, showers, washing facilities and the like and directed to the grey water inlet 62. Grey water continues to enter the collection tank 60. The transfer pump 64 may be located in the bottom of the grey water collection tank 60 and may be operated by means of a float switch or the like. Upon operation of the transfer pump 64, grey water collected in the collection tank 60 is transferred via the transfer conduit 66 through the check valve 68 to the treatment tank 20. The transfer pump 64 will operate until such time as a determined quantity of grey water fluid is contained within the treatment tank 20. The treatment tank 20 includes a high level sensor 82 which may be a float which is connected to the controller 80 by input line 84. The volume of the treatment tank 20 as determined by high level sensor 82 defines a selected volume $Q_1$ of grey water to be treated.

When the high level sensor 82 senses that the volume $Q_1$ of the grey water is in the treatment tank 20, the controller 80 shuts off the transfer pump 64 via line 86 to ensure that no additional grey water is added to the treatment tank 20. As a further option, the transfer conduit 66 may include a solenoid controlled valve 69 controlled by controller 80 through line 88 to ensure no gravity flow from collection tank 60 to treatment tank 20.

Once the treatment tank 20 has been filled with quantity $Q_1$, the controller will cycle the circulating pump 28 which is connected to the controller by line 90. Upon operation of the circulating pump 28, liquid will be circulated through the treatment conduit 22. Liquid will be withdrawn through withdrawal conduit 24 to the pump 28 by valve 30 and through return conduit 26 to the tank 20. The valve 30 is positioned at all times during treatment to direct flow from the withdrawal conduit 24 into the return conduit 26 and prevent flow through the discharge conduit 32 until opened by controller 80.

The ozone generator 40 is a commercially available ozone generator. A particularly suitable equipment for a marine application is the ozone generator sold by A. H. Simpson Industries Limited of Ontario, Canada, under the model designation SW400. The ozone generator 40 draws in ambient air through the inlet 41. To enhance efficiency of the ozone generator, the inlet 41 advantageously directs the ambient air through a dryer 43. The air is then fed to the ozone generator 40 so that ozone is generated. The ozone generated then passes along the supply conduit 44 to the inlet point of a treatment mixer 42 located in the return conduit 26. Preferably the treatment mixer is a venturi injector. A suitable venturi injector is the equipment sold by Mazzei Injector Corporation of Calif., U.S.A., under the model designation 384. The controller 80 turns on the ozone generator 40, which is connected by line 92, when the circulating pump 28 is cycled.

Under the effect of the circulating pump 28, liquid to be treated is continuously withdrawn from the treatment tank 20, circulated through the withdrawal conduit 24 where it passes by the valve 30 and into the return conduit 26. The passage of the liquid by the treatment mixer 42 draws ozone into the liquid to be treated thereby ensuring delivery of ozone to the fluid circulating in the treatment conduit and ensuring intimate mixing of ozone with the liquid travelling along the treatment conduit.

The treatment of grey water is essentially a batch system. The volume of water to be treated is determined by the volume of the treatment tank 20. The designated volume of water to be treated, $Q_1$, is thus circulated by the circulating pump 28 continuously by the treatment mixer 42. The circulating pump 28 and the ozone generator 40 operate for a predetermined period of time $T_1$ to ensure that a suitable supply of ozone is injected into the liquid to be treated and to provide suitable contact between the ozone and all of the liquid to be treated.

After a designated period of time, $T_1$ of operation of the circulating pump 28, the controller 80 moves valve 30 to the discharge connect position by means of control line 94. At this time, the circulating pump 28 then withdraws liquid from the treatment tank 20 and discharges that liquid through the discharge conduit 32. The circulating pump 28 continues to run until the treatment tank 20 is emptied. Emptying of the treatment tank 20 is sensed by a low level sensor 96. A signal is passed through line 98 to controller 80. The controller then stops the pump 28 and the generator 40 and resets all controlled items ready to handle another batch.

Since this is a batch process, the amount of liquid $Q_1$ to be treated is known. The treatment time $T_1$ can also be set by the controller to ensure treatment for any desired length of time. The amount of ozone generated by the ozone generator 40 in time $T_1$ will also be known. As during the treatment, ozone is admixed continuously into the liquid being treated by the mixer 42, sufficient contact time can be ensured to ensure treatment of the quantity $Q_1$ of grey water to any desired level. The volume of the treatment tank 20 can be configured to meet whatever constraints drive the overall size of the equipment. Where the equipment is to be installed on a marine vessel, space may be at a premium and the batches treated may be relatively small batches in the order of 3 gallons. With a small volume of $Q_1$, the treatment time $T_1$ may be relatively short, in the order of 3 minutes. Where space is not quite such a premium, then the treatment tank may be larger; with a larger treatment volume $Q_1$, longer circulation times $T_1$ can be programmed into the controller to ensure satisfactory contact of the batch with the ozone to provide suitable treatment prior to discharge. One of the advantages of providing the optional collection tank 60 is the provision of additional storage of grey water prior to treatment . Thus, if a shower is being used, the grey water from the drain may be collected at any convenient flow rate which is not subject to the batch treatment limitation, $Q_1$ and $T_1$. The size of the grey water collection tank will be determined by desired interim storage capacity and the treatment parameters of time and quantity.

In circumstances such as marine vessels and the like there will still be required, holding tanks for black water. Black water emanating from the vessel's toilet will need to be collected in a black water collection tank 70. As the primary constituent of such black water will be human sewage, this will normally be stored in the tank and subsequently pumped out in available pump out stations. However, in order to extend the capacity of the black water holding tank 70, the black water holding tank may be arranged so that an overflow conduit 72 may be arranged to permit liquid above a certain level in the black water holding tank 70 to flow over by gravity into the grey water collection tank 60. Liquids at the top of the black water collection tank 70 may be, in essence, not substantially different than the content of the grey water input and thus may be suitable for treatment in the batch system discussed above. Sediment or other nonliquid constituents of the black water holding tank 70 would, however, be retained in the lower reaches of the black water holding tank where they will remain until pumped out at a sanitary pump out station. By providing an over flow of the black water holding tank 70 for the liquids at the upper reaches of the black water holding tank, the effective capacity of the vessel between required pump outs may be extended by treating the upper surface liquids in the grey water treatment system.

Advantageously the treatment system 10 also comprises an ozone vent conduit 46. The vent conduit 46 communicates from the top of the treatment tank 20, ultimately to the discharge conduit 32. As ozone is continuously introduced into the batch during the operation of the circulating pump 28, gas pressure may build up in the treatment tank 20. Any ozone building up in the treatment tank 20 is then vented to the discharge conduit 32 ensuring that a continuous fresh supply of ozone from the generator 40 will be introduced into liquid being treated through the treatment mixer 42. Advantageously, the ozone conduit vent 46 may be directed to the grey water collection tank 60. Thus, any ozone from conduit line 46 will achieve slight pretreatment and deodorization in the collection tank 60. The collection tank 60 is vented in turn through conduit 46A to the discharge conduit 32. Check valves 47A and 47B ensure no back flow in vent conduit 46 and 46A respectively. Also, as shown diagrammatically, the vent conduit 46A contains a vertically upwardly directed run 48 to prevent inadvertent draining of collection tank 60 directly to discharge conduit 32 which might occur while a vessel is moving through wave action or other motion.

Figure 2:
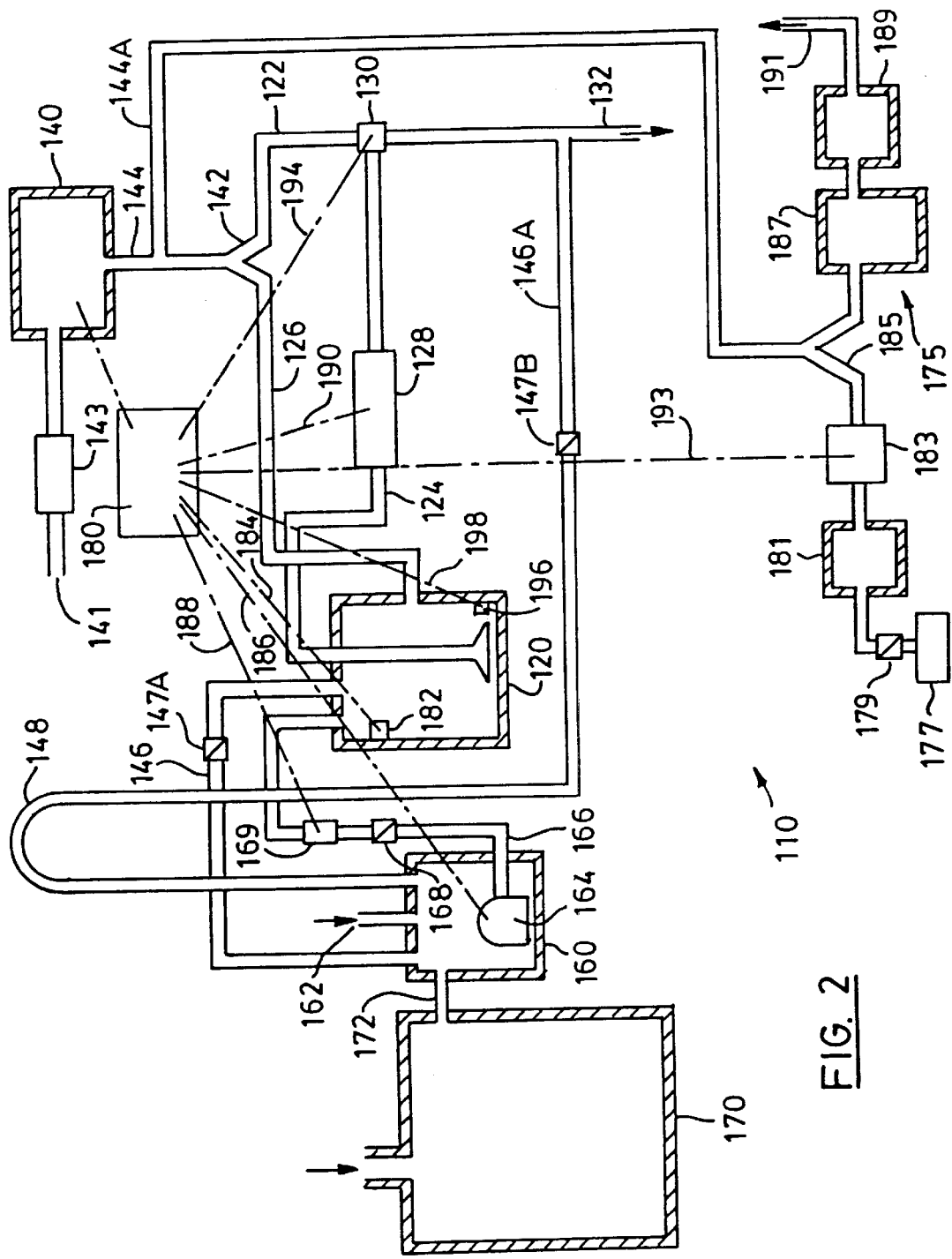
FIG. 2 illustrates a system embodying an alternate aspect of the invention.

FIG. 2 illustrates a modified version of the treatment system shown in FIG. 1. The treatment system in FIG. 2 is essentially similar to the treatment system shown in FIG. 1 with the addition of a potable water treatment system utilizing the same ozone generator. Similar parts of the system 110 shown in FIG. 2 corresponding to those in FIG. 1 have been given like numbers with the prescript 1. Thus, ozone generator 140 in FIG. 2 corresponds to ozone generator 40 in FIG. 1.

Accordingly, the water treatment system 110 as shown in FIG. 2 comprises a grey water collection tank 160, treatment tank 120 and ozone generator 140. The circulating pump 128 circulates liquid to be treated through the withdrawal conduit 124 and through return conduit 126. The return conduit 126 includes a treatment mixer 142. After treatment for the set time the valve 130 in the treatment conduit 122 is opened by controller 180 so that the circulating pump 128 discharges through the discharge conduit 132. Advantageously a black water collection tank 170 is fluidly connected to the collection tank 160 by an overflow conduit 172. The transfer pump 164 transfers liquid from the collection tank 160 through the transfer conduit 166 by check valve 168, into the treatment tank 120.

The system 110 includes a potable water treatment system illustrated generally at 175. In the system 110 illustrated in FIG. 2, the supply conduit 144 comprises a second conduit 144A for delivery of ozone from the ozone generator to the potable water system 175.

The potable water treatment system comprises a raw water inlet system 177, check valve 179, a filter 181, a supply pump 183, a supply mixer 185, a retention and air release tank 187 and a carbon black filter 189. The supply mixer 185 may be similar to treatment mixer 142 and treatment mixer 42. The potable water treatment system 175 comprises a potable water outlet 191 which may be connected to taps, tanks or other desired sources of drinking water within the facility in which the system 110 is installed.

The potable water purification system 175 commences to operate upon operation of the supply pump 183. The supply pump 183 may be cycled by demand such as with a manually operated switch such as a foot switch or the like. When the supply pump 183 operates the controller receives a signal through line 193 and the ozone generator 140 is also turned on to supply ozone. Raw water from ambient such as a lake, river, or stream, in the case of a boat, or a well or other suitable surface water at a cottage or rural dwelling, is drawn through the raw water inlet 177. The check valve 179 prevents any back flow. The raw water is first passed through a filter 181 to remove any gross particles in the water prior to entry into the supply pump. The supply pump 183 then forces the water to be treated through the supply mixer 185. The supply mixer draws the ozone from the generator 140 and ensures mixing and contact with the raw water. The tank 187 provides a facility for releasing any gases or ozone contained in the water for collection in the tank 187. A final "polishing" of the water is achieved by passing the water through the carbon black filter 189. In addition, the carbon black filter 189 converts any ozone molecules in the raw water to oxygen molecules. After passage through the filter 189 the water is delivered to the source of drinking water.

The system 110 provides a very compact system for use in vehicles where storage capacity is limited. As all incoming raw water is treated, the need to maintain large fresh water storage tanks on a vessel can be substantially reduced, if not totally eliminated. The amount of holding tank capacity for black water may be reduced and the opportunity for treatment of all grey water before overboard discharge will eliminate the need for substantial grey water holding capacity.

As set out above, the size of the batch of material to be treated, $Q_1$, can be determined by the designer of such a system based on available space requirements. The treatment time $T_1$ is advantageously selected to ensure appropriate treatment of the waste water to meet applicable discharge regulations. The treatment need of grey water is often specified in terms of biological oxygen demand (BOD) and chemical oxygen demand (COD). Grey water will be wide ranging from waste water which has a very low BOD and low COD to waste water having a much higher BOD and a much higher COD. There are two additional factors which are advantageously considered when determining the treatment time $T_1$. These include the amount of ozone that is available for mixing with the water being circulated by the circulating pump 28 and also the success in dissolving the available ozone in the water. The contacting of the available ozone with the water occurs initially in the treatment mixer 42, but of course continues in the turbulence which occurs as the water is circulated through the treatment conduit 22, the pump 28 and the treatment tank 20. We have carried out tests for these features to determine preferred operating conditions of the system.

A first group of tests were carried out using dechloronized, deionized and filtered laboratory water as the water to be treated. This low demand test water has essentially no BOD nor COD. This low demand test water was then used in tests to determine the effectiveness of ozone injection and dissolving of the ozone in the water. The effectiveness was determined by measuring the residual ozone in the low demand water using a spectrometer. For these tests, a ozone generator available from A. H. Simpson as outlined above was used in the test system together with different sizes and numbers of injectors from Mazzei Injector Corp.

Surprisingly, the first batch of tests showed an unsatisfactory residual ozone created in the low demand water. Observed ozone levels generally were less than 0.5 mg/liter of low demand water.

Various steps were taken to attempt to increase the residual ozone amount. As one test, the air inlet 41 was equipped with a supply of commercial oxygen. Using commercial oxygen produced increased residual ozone in the water circulating in the treatment conduit 22. Also, as might be expected, increasing the processing time T also tended to increase the residual ozone in the water.

As an additional part of this testing program, a high demand (high BOD and COD) test fluid was created in the laboratory. Because of the high demand, it was felt that such tests would be a useful indicator to determine whether the required amount of ozone necessary to treat grey water or contaminated water was in fact available and dissolved in the water. The tests were carried out using commercial oxygen supplied to the inlet 41. After running the system for times slightly less and slightly greater than 2 minutes, it was determined that the residual ozone in the high demand water being treated was either zero or only slightly above zero. This lack of residual ozone appears to indicate that all available ozone was consumed by the BOD and COD demand of the water and from this it may be inferred that insufficient treatment may have occurred.

In order to overcome the apparent limitations as set out in these first experiments, various techniques were tested. As stated above, providing a commercial oxygen supply rather than using ambient air, initially provides greater oxygen to the generator, thus resulting in more conversion to ozone and a greater quantity of ozone is available in supply conduit 44.

Another aspect of solution of these observations was to obtain better mixing of the available ozone. While a single ozone injector is described and illustrated in FIG. 1 and labelled treatment mixer 42, use of a plurality of injectors assists in both the flow of ozone into the treatment liquid and additionally mixing of the available ozone into the water to be treated. Thus, tests were carried out using a plurality of injectors operating in parallel to see if this would show increased levels of residual ozone in low demand water. Finally, consideration was given to using two circulating pumps in place of the single circulating pump 28 illustrated in FIG. 1, to provide enhanced circulation. Using pumps operating in parallel, a higher volume of flow of water through the treatment conduit 22 would be achieved. This, in turn, would produce higher vacuum in the treatment mixer or mixers, thus drawing more ozone into the system as well as assisting in mixing the ozone generated with the water being treated.

In subsequent testing, another avenue wag explored in an effort to ensure suitable treatment. This included the use of larger ozone generators. Firstly, tests were done using a generator produced by the A. H. Simpson company which was rated as being capable of generating 400 mg of ozone per hour. A still larger A. H. Simpson generator capable of producing 800 mg of ozone per hour was then used. This step helped to increase the residual oxygen in the low demand water, but at increased cost for the larger ozone generator.

Tests which had been conducted were conducted using atmospheric air available in the laboratory where the tests were being carried out, or a supply of commercial oxygen available in the laboratory was used for input to inlet 41. As beneficially increased results were occurring using commercial oxygen as the source of gas entering inlet 41, avenues were then explored to determine whether there was sufficient oxygen available in the gas being drawn into the inlet 41. As an experiment on this point, additional ducting was added to the inlet 41 so as to draw in outside air rather than indoor air available in the laboratory. This also gave increased residual ozone in the low demand water being tested. The outside air being drawn in had a higher relative humidity. This then showed that use of a dryer such as dryer 43 in inlet 41 gave much better production of ozone from the generator. Thus, in preferred embodiments, particularly when moisture laden air is drawn in to inlet 41, a dryer is advantageously used.

As an additional step in enhancing the effectiveness of dissolution of the ozone generated, into the water being circulated, a surfactant was added to the low demand water. The use of a surfactant, when other test conditions remained the same, increased the residual ozone in the water being circulated. This indicates that the surfactant aids in the uptake of the ozone so that there is in fact a higher residual ozone content of the mixed water, thereby leading to enhanced treatment. The surfactant added more closely mimics grey water which will naturally contain surfactants in the form of detergents or other soaps, in most cases.

A test was then carried out on a laboratory created simulated highly contaminated water. The system as shown in FIG. 1, was operated using a Simpson ozone generator rated as being capable of producing 800 mg/hour of ozone. Three Number 3, Mazzei injectors operating in parallel were used. The Simpson ozone generator was supplied with pure oxygen available in the laboratory. The batch size was 10.9 liters or 2.40 imperial gallons. The system was operated for a processing time of just over 50 seconds with low demand water. First, the residual ozone in low demand water was measured at slightly over 1.5 mg/liter. A test was then run on this sytem with a simulated highly contaminated water. The water treated was generated in the laboratory to simulate water having a very high BOD and a very high COD typical of the highest levels of demand normally experienced when dealing with grey water and to make the test more severe, the test sample additionally contained a concentrated sewage from a sewage collection facility.

This highly contaminated water was then used to determine the percentage reduction which might be achieved in respect of the Total Coliform, Fecal Coliform and *E-coli* using the system described above. The amount of Total Coliform, Fecal Coliform and *E-coli* was analyzed before treatment and after treatment and the figures compared. Although severe, it is considered that this is an apt test to demonstrate the effectiveness of the system. The ozone introduced into the highly contaminated water will first be used up in satisfying the BOD and the COD. Any ozone remaining after satisfying these demands is then available to kill any bacteria, viruses, parasites and spors which may be present in the water to be treated. By determining the reduction in Total Coliform, Fecal Coliform and *E-coli,* a useful measure of the effectiveness of the system is obtained.

The system was operated for 25 seconds in a first test, 53 seconds in a second test and 95 seconds in the third test on this highly contaminated water. When run for 25 seconds, the analysis of the treated fluid showed that *E-coli* had been reduced by 18%, Total Coliform did not show any significant reduction and Fecal Coliform had been reduced by 10%. This result shows insufficient treatment of the water. When the system was run for 53 seconds, the treated water showed that *E-coli* had been reduced 35%, Total Coliform count had been reduced by 37% and Fecal Coliforms had been reduced by 67%. This shows improved results, but this level is still likely to be insufficient to meet most discharge requirements.

When the system was operated for 95 seconds, analysis of the treated water showed that *E-coli* had been reduced by 99.40%, Total Coliform had been reduced by 99.67% and Fecal Coliform had been reduced by 94.60%. This is an excellent result.

The results of these tests do show, as indicated above, that the time of treatment $T_1$ is a significant factor in producing a satisfactory treatment level. The test using the system operating as explained above for a time of 95 seconds shows excellent treatment of the highly contaminated water, a result which would permit overboard discharge from a marine vessel in accordance with most disposal regulations. Such a system is thus able to treat a batch of approximately 10.9 liters of highly contaminated water in just over one and a half minutes.

Figure 3:
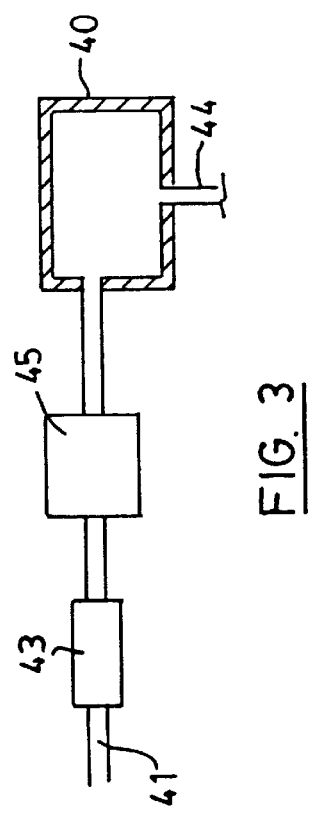
FIG. 3 illustrates an alternative embodiment of a portion of the system of FIG. 1.

As the system described above in connection with these tests has been demonstrated to operate successfully, further tests were then carried out to optimize the system components. Tests were performed utilizing a series of larger generators from the A. H. Simpson company. While these tests indicate slightly increased residual ozone in low demand water, the increase in available ozone did not appear to offset the increased cost of providing a larger generator. Surprisingly, during these tests, it was ascertained that a factor in the amount of ozone produced arises from the fact that the ozone system as explained above was not pressurized. Ozone is supplied in the treatment conduit as outlined in FIG. 1 by reason of the negative pressure developed by the treatment mixer 42. The treatment mixer 42, being of the venturi type, produces a suction pressure which draws the ozone into the treatment mixer. An advantageous modification of the structure illustrated in FIG. 1 is illustrated in FIG. 3. The inlet 41 for the ozone generator 40 includes a dryer 43 and an air pump 45. The air pump 45 thus pressurizes the feed to the ozone generator 40. Using pressurized air, satisfactory residual ozone was produced in the fluid to be treated when determined by using a sample fluid having little or no BOD and COD. Pumping air into the ozone generator gives successful results using fresh ambient air so that commercial oxygen which otherwise would increase cost of operation is not required.

Figure 4B:
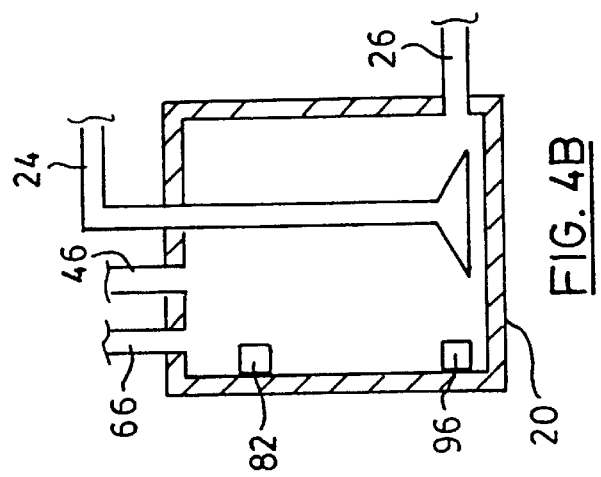
FIG. 4B illustrates an alternate arrangement of the parts of the portion of the system of FIG. 1 illustrated in FIG. 4A.
Figure 4A:
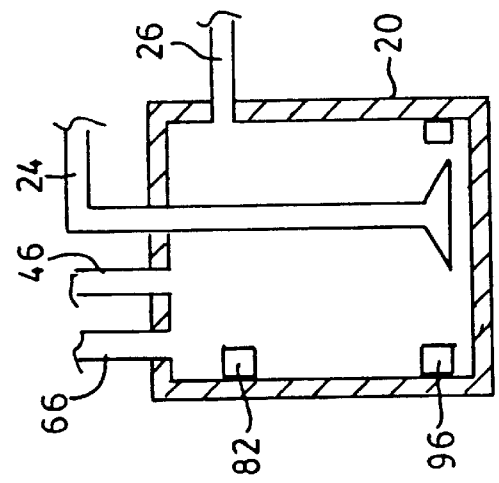
FIG. 4A illustrates a first arrangement of parts of a portion the system of FIG. 1.

Another surprising aspect that developed during such testing, is the role played by the arrangement of the batch treatment tank. FIGS. 4A and 4B show diagrammatically, two different arrangements of the batch treatment tank. In FIG. 4A, the return conduit 26 enters the treatment tank 20 at the upper regions of the tank substantially adjacent to the high level sensor 82. In FIG. 4B, the return conduit 26 enters the treatment tank 20 substantially below the level of the fluid in the tank adjacent to the low level sensor 96. With the arrangement of the return conduit 26 adjacent the upper region of the treatment tank as shown in FIG. 4A, it was noted that additional flow of gas was achieved in supply conduit 44. With the return conduit 26 located adjacent the lower region of the treatment tank as shown in FIG. 4B, there was less flow in the supply conduit 44. However, the flow of greater amounts of ozone in supply conduit 44 with the configuration of FIG. 4A did not lead to increased residual ozone in the water to be treated. In fact, the greatest residual ozone level was achieved with the arrangement shown in FIG. 4B. Operating the device as illustrated in FIG. 4A using atmospheric air rather than pressurized air to the inlet 41 showed an increased flow in supply conduit 44 of 4.75 cubic feet per hour, but a residual ozone in the low demand water of only 0.23 mg/liter after 96 seconds cycle time. Using the same equipment, but with a bottom feed to the treatment tank 20 as illustrated in FIG. 4B, the flow rate in supply conduit 44 was observed to have fallen to 3 cubic feet per hour. However, after the same processing time, the residual ozone in the low demand water had increased to 0.39 mg/liter. These figures appear to indicate that returning the water from the treatment mixer 42 to the bottom of the batch treatment tank 20 further assists in dissolving the ozone into the water where it is available for treating the water.

Based on the above testing, a commercially effective arrangement involves the use of an air pump feeding a moderate sized ozone generator such as the Simpson generator rated at 800 mg/hr production, with the air pump moving a supply of fresh air drawn in through a dryer. The use of larger ozone generators does not seem to be cost justified. One Mazzei No. 8 mixer also appeared to be sufficient although a No. 6 injector may also be sufficient. Use of multiple parallel venturi injectors did not produce results sufficiently enhanced to offset the expense of the multiple injectors. Best results were achieved using a bottom feed to the treatment tank 20.

From reviewing the above examples and description, it will be appreciated that a relatively compact system can be created for successful treatment of highly contaminated water having very high BOD and COD and various pollutants to the point where the treated water is substantially enhanced before being discharged. The effectiveness of the system in treating contaminated water also shows that the system may be used in a combined system, for enhancing the quality of drinking water produced from raw water which may be available from a lake or on board the vessel or facility where the system is installed.

Although municipal regulations may not yet permit the discharge of black water after treatment in such system, the above tests with highly contaminated fluids show that even water having very high BOD and very high COD and other pollutants can be treated in the system in accordance with this invention. Such a system may be acceptable for treatment of the non-solids portion of black water or at least a portion of the contents of a black water holding tank.

While the system has been described in connection with preferred embodiments of the system, various changes and modifications to the system may be made. The full scope of the invention is to be determined by reference to the following claims.

We claim:

1. A system for treating a predetermined quantity of waste water for disposal, said system comprising a treatment tank, said treatment tank having a capacity sufficiently large to accommodate said predetermined quantity of water, a transfer conduit for transferring water into said treatment tank, shut off means for preventing flow through said transfer conduit, a treatment conduit, a water circulating pump located within said treatment conduit, an ozone generator, at least one ozone/water mixer, a discharge valve, and control means, said control means controlling cycling of said water circulation pump, said control means controlling operation of said ozone generator, said control means controlling the position of said discharge valve, said treatment tank comprising water level sensing means to determine the presence of said predetermined quantity of water in said treatment tank, said control means comprising timing means for operating said water circulating pump for a selectable time period, said control means controlling said shut off means to stop flow through said transfer conduit when said water circulation pump is operating.

2. The system of claim 1 wherein said system further comprises an air pump, said air pump adapted to deliver gas under pressure to said ozone generator.

3. The system of claim 2 wherein said air pump is in an inlet for said ozone generator and said inlet is adapted to draw in air from ambient surroundings.

4. The system of claim 3 wherein said inlet includes a dryer for drying said air.

5. The system of claim 2 wherein said air pump is connected to a source of oxygen.

6. The system of claim 1 wherein said system comprises a treatment conduit and said water circulating pump is located within said treatment conduit, and wherein said treatment conduit comprises an exit end for returning water from said treatment conduit to said treatment tank.

7. The system of claim 6 wherein said exit from said treatment conduit is located on said treatment tank below the level of liquid in said treatment tank.

8. The system of claim 7 wherein said exit is adjacent the bottom of said treatment tank.

9. The system of claim 7 wherein said treatment tank comprises a high level sensor for sensing an upper level of liquid within said treatment tank, said high level sensor comprising an output signal for indicating that liquid level in said treatment tank has reached a predetermined level.

10. The system of claim 9 wherein said system comprises a grey water collection tank, said transfer conduit transfers water from said grey water collection tank to said treatment tank and wherein said transfer conduit comprises at least one valve, and wherein said control means closes said at least one valve in said transfer conduit upon receiving a signal from said high level sensor means.

11. The system of claim 10 wherein said system further comprises a black water collection tank, said system further comprising a second transfer conduit for transferring liquid from said black water collection tank to said grey water collection tank.

12. The system of claim 10, said system further comprising potable water treatment means, said potable water treatment means comprising a raw water inlet, a raw water circulation pump, an ozone mixer for mixing ozone with raw water, and a filter for removing dissolved ozone from said water after mixing with said water.

13. A system for treating a predetermined quantity of waste water for disposal, said system comprising a waste water collection tank, a waste water treatment tank, a transfer conduit for transferring water into said treatment tank, shut off means for preventing flow through said transfer conduit, a treatment conduit, a water circulating pump, an ozone generator, at least one ozone/water mixer, a discharge valve and control means, said treatment conduit including said water circulating pump and said at least one ozone/water mixer and wherein said discharge valve is in fluid communication with said treatment conduit, said control means, controlling cycling of said water circulation pump, said control means controlling operation of said ozone generator, and said control means controlling the position of said discharge valve, said waste water treatment tank including water level sensing means to determine the presence of said predetermined quantity of water in said treatment tank, said control means comprising timing means for operating said water circulating pump for a selectable time period, said control means controlling said shut off means to stop flow through said transfer conduit when said circulation pump is operating, said treatment conduit having an inlet for withdrawing waste water from said waste water treatment tank, said treatment conduit having an exit for returning water to said treatment tank and said exit is located adjacent the bottom of said treatment tank, said system further comprising an air pump, for delivery of gas under pressure to said ozone generator.

14. The system of claim 13 wherein said system further comprises a black water collection tank, and said system further comprising a second transfer conduit for transferring at least a portion of said contents from said black water collection tank to said waste water collection tank.

* * * * *